Nov. 11, 1969  R. L. WHITE  3,477,739
AIR COMPRESSOR WITH PLURAL PISTONS
Filed Jan. 22, 1968

INVENTOR.
Robert L. White
BY
C. R. Engle
ATTORNEY

United States Patent Office 3,477,739
Patented Nov. 11, 1969

3,477,739
AIR COMPRESSOR WITH PLURAL PISTONS
Robert L. White, Frankenmuth, Mich., assignor to General Motors Corporation, Detroit, Mich., a corporation of Delaware
Filed Jan. 22, 1968, Ser. No. 699,651
Int. Cl. B60g *11/46, 11/56;* F04b *25/00*
U.S. Cl. 280—124                                         4 Claims

ABSTRACT OF THE DISCLOSURE

In preferred form, this disclosure concerns a plural piston air compressor supplying compressed air in response to normal road frequency movement between vehicle sprung and unsprung masses. The pistons are colinearly arranged so that successive pistons supply the compressed air as vehicle load varies.

---

This invention relates to an air compressor supplying pressurized air for use in vehicle fluid systems. More specifically, this invention relates to an air compressor having plural telescoping pistons and cylinders providing compressed air through a range of vehicle suspension heights.

Air compressors having plural pistons are well known and in particular some of these air compressors have been used in vehicle suspension systems for maintaining the sprung to unsprung masses of the vehicle at a predetermined height regardless of the load placed thereon. However, heretofore none of these compressors have included means compensating for varying vehicle load height changes while automatically supplying compressed air in response to road frequencies developed during operation of the vehicle.

Therefore, among the objects of this invention is the provision of a single acting air compressor comprising plural linear pistons providing a pumping action regardless of vehicle height between the sprung and unsprung vehicle masses.

A further object of this invention is the provision of an air compressor, including plural pistons, which provides pressurized air to a vehicle mounted reservoir in response to road frequencies resulting from movement of the unsprung mass with respect to the sprung mass.

Another object of this invention is the provision of an air compressor capable of supplying pressurized air through a variable stroking range.

A still further object of this invention is the provision of an air compressor capable of being readily attached to a vehicle.

Further objects and advantages of the present invention will be apparent from the following description, reference being had to accompanying drawings wherein a preferred embodiment of the invention is shown for purposes of illustration.

Figure 1:
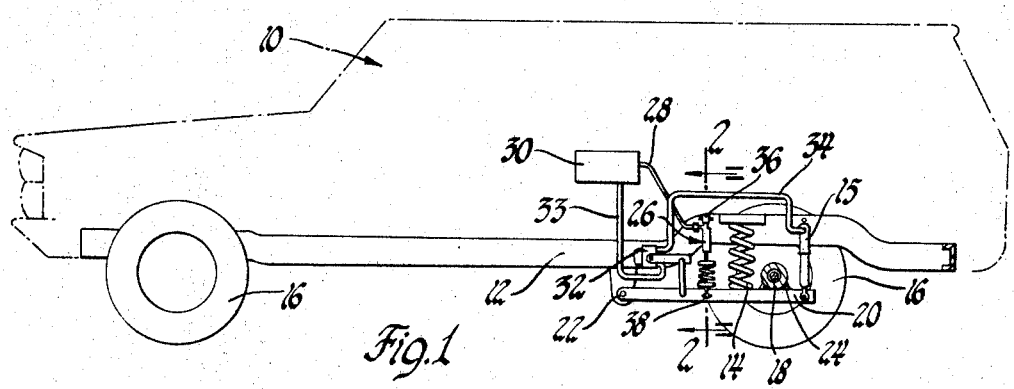
FIGURE 1 is a side elevational view, partly in section, of a vehicle having a fluid system including the air compressor of the present invention.

Referring to FIGURE 1, a vehicle 10 is shown comprising a frame 12 which is resiliently supported by an automatic pneumatic leveling suspension means including springs 14 and height adjusting cylinders 15 mounted on wheel assemblies 16 including a rear axle housing 18. A beam 20 is pivotally attached to frame 12 by a pin connection 22 and is rigidly secured to the axle housing 18 at 24. Body 10 and frame 12 being resiliently mounted with respect to the wheel assemblies 16, constitute the sprung mass of the vehicle while the latter including beam 20 represent the unsprung mass. A shock absorber type air compressor 26, which is the subject of this invention, is connected between frame 12 and beam 20 and supplies pressurized air through line 28 to a reservoir 30. A leveling control valve 32 is connected between the height adjusting cylinders 15 and reservoir 30 by lines 33 and 34 to supply pressurized air to the cylinders and maintain the vehicle in a level position.

Figure 2:
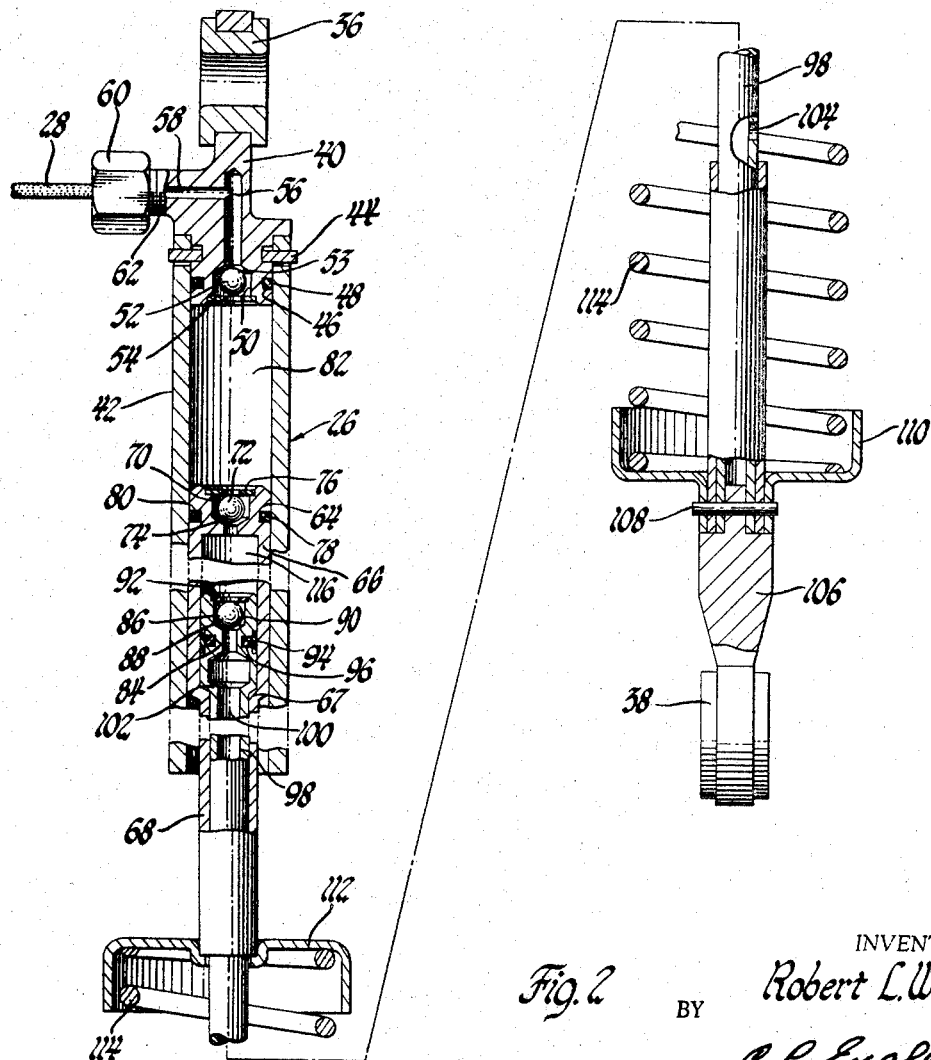
FIGURE 2 is a partial vertical sectional view taken along lines 2—2 of FIGURE 1.

With reference to FIGURE 2, the air compressor 26 is shown including connection fittings 36 and 38 which are respectively secured to frame 12 and beam 20 as shown in FIG. 1. Connection fitting 36 is secured in a cap 40 which serves as a support member for one end of the air compressor 26. The cap 40 is retained in a first hollow member or cylindrical body 42 by a lock pin 44 and sealingly engages the interior surface of cylinder 42 by an O-ring 48 placed in machine groove 46. The cap contains a drilled counterbore 50 within which a ball check valve 52 is retained adjacent shoulders 53 by a spring washer 54. A longitudinally drilled passage 56 connects with a horizontal passage 58 which in conjunction with the counterbore 50 forms a fluid passage through the cap member 40. Line 28, illustrated in FIGURE 1, is connected to cap 40 by a nut 60 which is received on a threaded portion 62 of the cap 40.

A first piston 64 forms a sleeve cylinder or second hollow member 66 which is necked down at 67 and is integral with a stem portion 68 for a purpose later to be described. A counterbored passage 70, containing a ball check valve 72 operably retained between shoulder 74 and spring washer 76, provides a passage through piston 64. Fluid flow around the piston in cylinder 42 is prevented by O-ring 78 placed in groove 80. The piston 64 cooperating with cap 40 forms a compression chamber 82.

A second piston 84 also is counterbored containing a cavity 86 which receives a ball check valve 88 retained between shoulder 90 and spring washer 92. This piston sealingly engages the interior of cylinder 66 by means of O-ring 94 placed in piston groove 96. A hollow piston rod 98 containing passage 100 is integral with piston 84 and is necked down at 102 which is normally in mating engagement with the necked down portion 67 of cylinder 66. The piston rod 98 includes a drilled air inlet orifice 104 and is secured to a lower support member 106 containing the connection fitting 38 by a pin 108. A cup-shaped annular bracket 110 also is fastened to the support 106 by the pin 108 and combines with a similarly shaped bracket 112 slidably disposed on rod 98 to support a coil spring 114 therebetween. Spring 114 normally biases piston 84 to an extended position through engagement of the cap 112 with stem portion 68 providing a compression chamber 116 between the piston 84 and piston 64 in sleeve cylinder 66.

In operation it is evident by virtue of this arrangement pumping can take place through two different ranges of vehicle height. In situations where the vehicle is carrying a relatively light load piston 84 is free to reciprocate, for example, through a distance of approximately 3.43 inches within the cylinder 66, and compress air drawn through inlet orifice 104, passage 100, and check valve 88. The air compressed in chamber 116 is forced around check valve 72 into cylinder 42 and past check valve 52, through passages 56 and 58 to line 28 for transmission to reservoir 30. When the vehicle is subjected to a relatively heavy load, piston 84 moves the distance of approximately 3.43 inches and bottoms against piston 64. The piston 64 is then reciprocated by the relative movement between the sprung and unsprung masses created by normal vehicle operationing road frequencies to draw air through orifice 104, passage 100, check valve 88 and past check valve 72 and into compression chamber 82. The air compressed by reciprocation of piston 64 is discharged to reservoir 30 in the manner previously described.

It is evident that spring 114 can be designed to have various spring rates to provide desired pumping movements in accordance with the relative sizes of pistons 64 and 84. A preferred design strength of the spring 114 is such that it provides a preload force approximately equal to the maximum pressure attainable in compression chamber 82. For purposes of illustration only, in an exemplary embodiment the relatively movable parts of the subject air compressor are designed so that piston 84 is capable of moving 4.75 inches in either direction. This magnitude was arrived at because four inches of movement is common between the sprung and unsprung vehicle masses. The maximum stroke of piston 84 with respect to piston 64 is approximately 3.43 inches in an upper direction where it engages the same. The maximum stroke of piston 64 is approximately 1.32 inches upwardly and 4.75 inches downwardly.

The pressure requirements to supply a sufficient amount of compressed air to level the average vehicle is in the range of 80 to 100 lbs. per square inch. The frequency of a rear suspension is in the general area of 8 cycles per second and though most of the strokes provided between a sprung and unsprung mass are small, occasionally an adequate stroke will occur supplying air to the reservoir. It is obvious that the time required to level the vehicle will depend upon the type of road surface being traversed.

From the above description it is apparent that this invention provides an air compressor capable of continuing to operate during varying heights between the sprung and unsprung vehicle masses. The subject air compressor is easily attached to the vehicle and is simply constructed for economical operation in conjunction with any vehicle air pressure system.

I claim:

1. In an air compressor comprising a first hollow member having valve means therein and forming a first cylinder, a second hollow member reciprocally disposed within said first hollow member and having a closed end constituting a piston and a sleeve portion constituting a second cylinder, a second piston reciprocally disposed within said second cylinder, said first hollow member being connected to first support means, a piston rod connected at one end to said second piston and having its other end connected to a second support means, spring means biasing said piston rod to an extended position, and valve means in said second piston and said first and second hollow members whereby relative reciprocation between either of the respective hollow members and said pistons pressurizes air.

2. In a vehicle having sprung and unsprung masses, an air compressor comprising first connection means secured to one of said masses, a first stage piston, a hollow piston rod containing an air inlet orifice connected to said first stage piston and said first connection means, a check valve in said first stage piston controlling the flow of air in passages therethrough, a second stage piston forming a cylinder for said first stage piston, a check valve in said second stage piston controlling the flow of air in passages therethrough, a spring engaging said first connection means and said second stage piston urging the first stage piston to an extended position, a hollow member forming a second cylinder, second connection means secured to said hollow member and to the other of said masses, and a check valve in said second connection means controlling the flow of air through passages therein, said first stage piston reciprocating within said second stage piston cylinder pressurizing air drawn through said inlet orifice and said hollow piston rod when said first stage piston is in the extended position, sufficient axial compression of said spring causing said first stage piston to engage said second stage piston whereby subsequent relative movement between said masses reciprocates said second piston within said second cylinder to compress air therein.

3. In a vehicle having sprung and unsprung masses, an air compressor comprisig a cylindrical body member, first supporting means secured to said body member, a first check valve and air outlet passages in said body member, a first piston telescopingly received within said cylindrical body member and forming a second cylinder, a second check valve controlling the flow of fluid through a passage in said first piston, a second piston telescopingly received within said second cylinder and containing a check valve controlling the flow of air through a passage therein, a hollow piston rod connected to said second piston, second supporting means secured to said hollow piston rod, and a coil compression spring connected between said second supporting means and said second cylinder to bias said hollow piston rod to an extended position when the vehicle carries a relatively light load whereby a first compression chamber is formed between said first and second piston, said first piston and said first supporting means forming a second compression chamber in said body member, said second piston reciprocating within said second cylinder to compress air in said first compression chamber when said spring is extended, said second piston engaging said first piston whereby the latter is reciprocated within said body member to pressurize air in said second compression chamber as said spring is in a sufficiently compressed condition when the vehicle carries a relatively heavy load.

4. In a vehicle having sprung and unsprung masses; an air compressor comprising a first supporting means adapted to be secured to the sprung mass; a hollow body member secured to said first supporting means and forming a first cylinder; a first piston forming a second cylinder reciprocally mounted within said body member; a second piston reciprocally mounted within said second cylinder; a second supporting means secured to the unsprung mass; a hollow piston rod connected to said second piston and said second supporting means and containing an air inlet orifice; a spring connected between said second cylinder and said second supporting means biasing said hollow piston rod to an extended position; and first, second and third check valves disposed respectively in said second piston, said first piston and said first supporting means controlling the flow of air in passages therethrough; said second piston reciprocating in said second cylinder pressurizing air drawn through said orifice and said hollow piston rod when the vehicle is subjected to relatively light loads and said spring is in an extended position; said second piston engaging said first piston whereby the latter is reciprocated and compresses air within said first cylinder when said spring is compressed in response to relatively heavy vehicle loads; both of said pistons reciprocating in their respective cylinders in response to relative movement between the sprung and unsprung masses developed during normal vehicle operation.

References Cited

UNITED STATES PATENTS

| 2,049,010 | 7/1936 | Horton | 180—54 |
| 3,285,617 | 11/1966 | Jackson | 280—124 X |

FOREIGN PATENTS

| 5,272 | 9/1901 | Austria. |
| 1,957 | 2/1892 | Great Britain. |
| 326,115 | 3/1930 | Great Britain. |

A. HARRY LEVY, Primary Examiner

U.S. Cl. X.R.

180—1; 230—201